(Model.)

L. P. KEECH.
PAPER FILING IMPLEMENT.

No. 318,990. Patented June 2, 1885.

WITNESSES

INVENTOR

Lawson P. Keech

UNITED STATES PATENT OFFICE.

LAWSON P. KEECH, OF BROOKLYN, NEW YORK.

PAPER-FILING IMPLEMENT.

SPECIFICATION forming part of Letters Patent No. 318,990, dated June 2, 1885.

Application filed April 10, 1884. (Model.)

*To all whom it may concern:*

Be it known that I, LAWSON P. KEECH, a citizen of the United States, residing at Brooklyn, in the county of Kings and State of New York, have invented certain new and useful Improvements in Paper-Filing Implements; and I do hereby declare the following to be a full, clear, and exact description of the invention, such as will enable others skilled in the art to which it appertains to make and use the same.

This invention is an implement made of a strip of sheet metal, one lengthwise edge of which is wound over a piece of hard or spring wire, said wire being a few inches longer than the strip and extending beyond one end only of said strip. The part of the piece of wire inclosed on the edge of the strip serves to stiffen the same, and the extended part to form a handle and hook. The strip is then folded lengthwise at a distance from the edge short of half its width, so that said edge when the strip is folded close does not reach to the top of the part turned over the wire, and being below it no injury to the hand or anything by the roughness of said edge can occur, as contact with it is prevented, and the smooth surface of the part wound over the wire being a protection.

The main object and adaptation of this improvement is for filing single or folded sheets of paper, cloth, &c., in any part of a volume clamped along its back edge by spring-pressure without removing the springs, the implement being used in the following manner: The edge of a sheet is placed in the fold of the implement, where it is easily kept in place by the fingers of both hands while said implement with sheet is forced within the pressed part of said volume. The portion of the sheet remaining free is then clasped by the hand against one side of the unpressed part of the volume while the implement is withdrawn endwise by the wire handle, thus leaving the sheet bound by the pressure within the volume.

The implement is illustrated in the accompanying drawings, in which—

Figure 1:
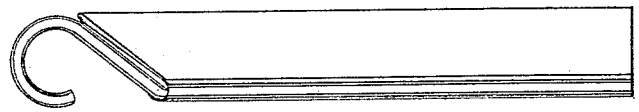
Figure 2:

Figure 1 is a perspective view of said implement, and Fig. 2 is a cross-section view of the same.

I am aware that prior to this invention implements have been made formed of sheet metal with a similar fold for receiving and filing sheets within a volume held by spring-pressure and so shaped as to be operated by forcing the implement out of the back of the volume. I therefore do not claim such a folded implement as new; but What I do claim as my invention, and desire to secure by Letters Patent, is—

The filing implement made of sheet metal folded as described, with wire bound along one edge and extended from one end sufficient to form a handle for withdrawing the same from the end of a volume, substantially as described.

In testimony whereof I affix my signature in presence of two witnesses.

LAWSON P. KEECH.

Witnesses:
W. MORRIS SMITH,
M. P. CALLAN.